United States Patent
Kulesha

(10) Patent No.: US 8,141,814 B2
(45) Date of Patent: Mar. 27, 2012

(54) LIGHTER-THAN-AIR VERTICAL LOAD LIFTING SYSTEM

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 11/945,047

(22) Filed: Nov. 26, 2007

(65) Prior Publication Data

US 2009/0134268 A1   May 28, 2009

(51) Int. Cl.
*B64B 1/34* (2006.01)
(52) U.S. Cl. ............................................ 244/26; 244/30
(58) Field of Classification Search ............ 244/125, 244/126, 127, 24–31
See application file for complete search history.

(56) References Cited

U.S. PATENT DOCUMENTS

| | | | | |
|---|---|---|---|---|
| 1,844,765 A | * | 2/1932 | Jackson | 244/5 |
| 1,884,706 A | * | 10/1932 | Hughes et al. | 244/25 |
| 3,008,665 A | | 11/1961 | Piasecki | 244/2 |
| 3,083,934 A | | 4/1963 | Vanderlip | 244/5 |
| 3,096,047 A | | 7/1963 | Dunn | 244/26 |
| 4,695,012 A | | 9/1987 | Lindenbaum | 244/26 |
| 5,005,783 A | * | 4/1991 | Taylor | 244/97 |
| 5,348,251 A | * | 9/1994 | Ferguson | 244/30 |
| 5,823,468 A | * | 10/1998 | Bothe | 244/2 |
| 5,906,335 A | * | 5/1999 | Thompson | 244/96 |

FOREIGN PATENT DOCUMENTS

| | | |
|---|---|---|
| CA | 1054124 | 8/1979 |
| DE | 2640433 | 4/1977 |
| DE | 10122139 | 11/2002 |
| WO | WO 8910868 A1 * | 11/1989 |
| WO | WO2007/064649 | 6/2007 |
| WO | WO2008/025139 | 3/2008 |

OTHER PUBLICATIONS

International Search Report and Written Opinion received in corresponding PCT Application Serial No. PCT/US2008/081217.

* cited by examiner

*Primary Examiner* — Joshua J Michener
*Assistant Examiner* — Brian M O'Hara
(74) *Attorney, Agent, or Firm* — Caven & Aghevli LLC

(57) ABSTRACT

An aerial load lifting system features a non-rigid or blimp-type dirigible providing a lighter-than-air envelope that is placed within a structural shell. The system is designed so that the envelope provides essentially neutral buoyancy for the structure, leaving only the cargo weight to be lifted by the rotors. The structural shell supports the engine, fuel tank, rotors, and transmission system that power the lift and vectoring of the aircraft, in addition to supporting the cargo load. The structural shell transfers the weight of the load directly to the location of the rotors, thus avoiding stress on the envelope.

22 Claims, 4 Drawing Sheets

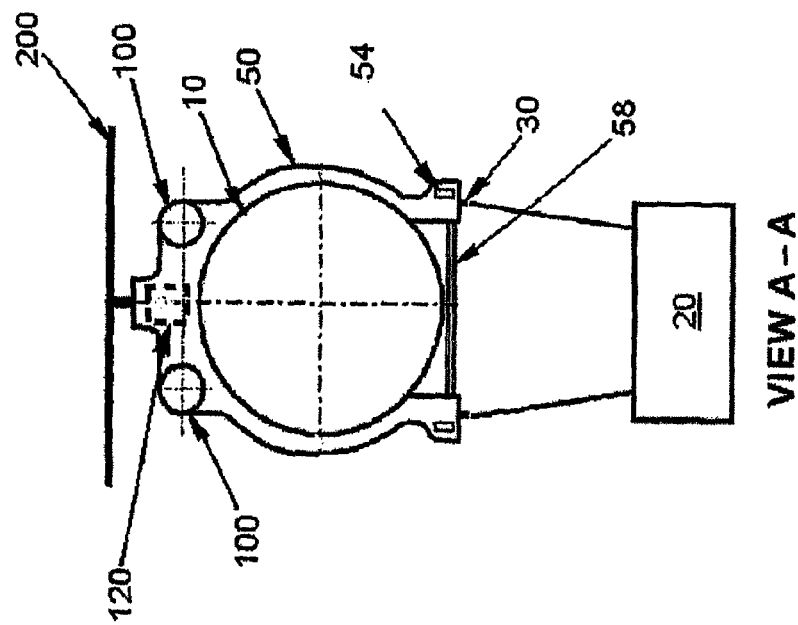
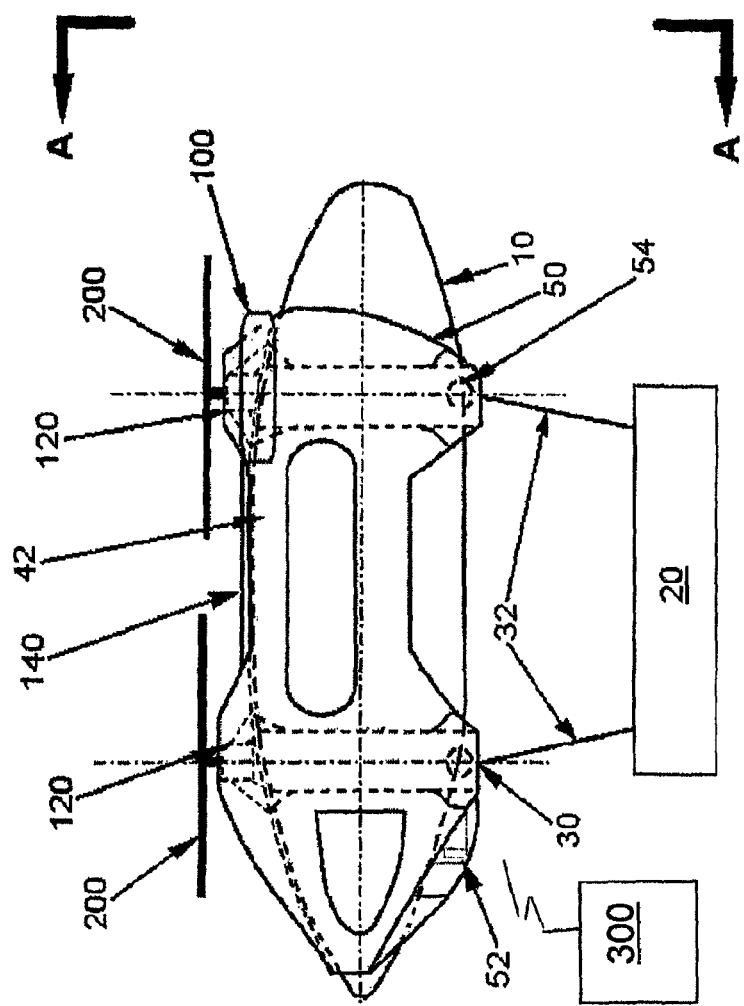
FIG. 1A
VIEW A-A
FIG. 1B

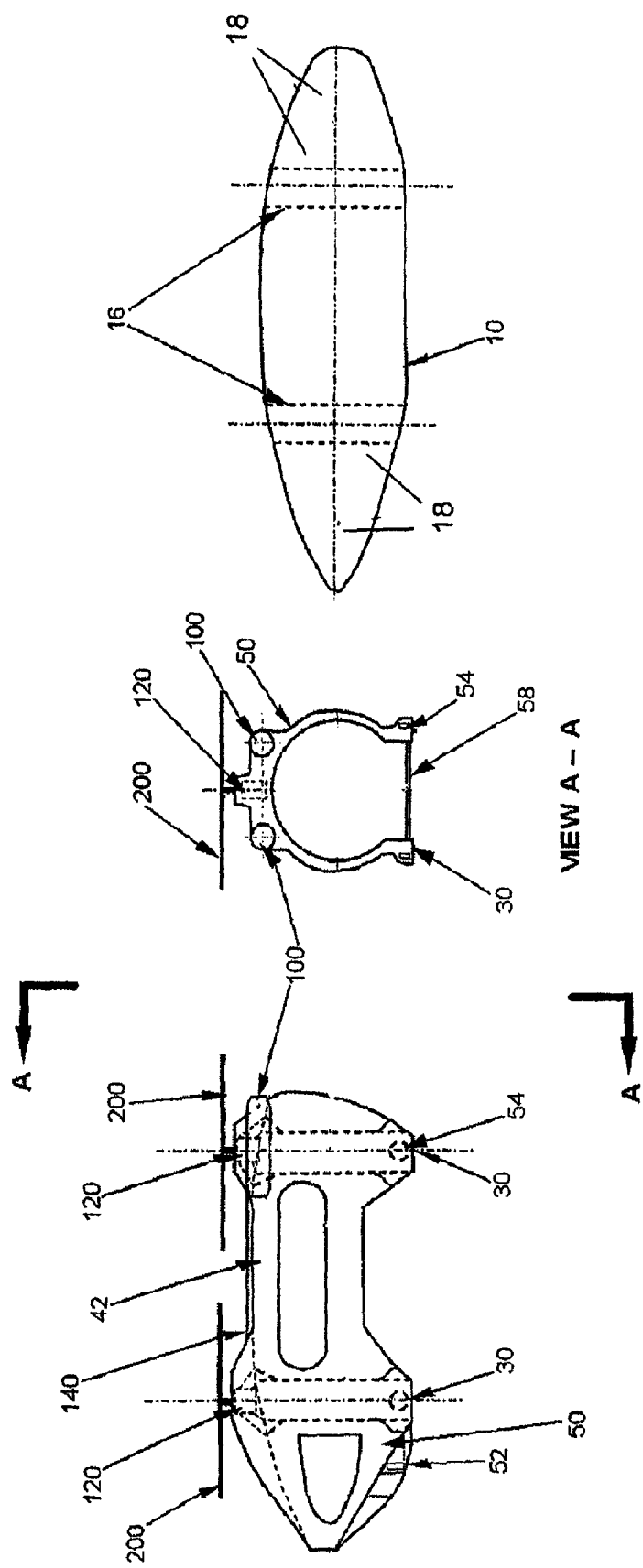

LIGHTER-THAN-AIR VERTICAL LOAD LIFTING SYSTEM

FIELD

The present disclosure relates to neutral buoyancy or lighter-than-air aerial load lifting systems. The disclosure has particular utility in connection with transportation systems for lifting and transporting payloads to remote locations and will be described in connection with such utility, although other utilities, including recreational, commercial and military utilities are contemplated.

BACKGROUND

As the demand for oil and other natural resources has resulted in mining and drilling operations in increasingly remote locations, the ability to gain access to these areas has become increasingly important. For instance, some remote areas are accessible in the winter by use of ice roads. As summer approaches, however, the thawing ice can make transport to these remote locations dangerous and/or destructive of the environments, e.g. the permafrost. A method of safely transporting heavy loads over these areas is a challenge of great importance.

Loads of large equipment or supplies can be exceedingly heavy. The power required to lift such loads with conventional machinery, such as helicopters, increases twofold as the weight of the machinery increases with the weight of the load. As greater load carrying capabilities are required, a solution is needed that will be able to lift very heavy loads without significantly increasing the weight of the lifting machinery. This will reduce the amount of power required and reduce the cost of transporting heavy loads to remote locations. Consider, for example, a helicopter with the capability to lift a load of 25,000 lbs. These same engines and rotors would be capable of lifting much more if the weight of the helicopter itself could be eliminated.

Solutions to this problem include utilizing a lighter-than-air transport to assist in carrying the required loads. One prior art example discloses a dirigible-type airship providing a lighter-than-air envelope that is tethered to one power source that controls the vectoring of the system and another power source that controls the lifting capability. See U.S. Pat. No. 4,695,012. The height of the system, measured from the balloon to the actual load, is very large, making the manufacturing and assembly difficult and expensive. The operation of the system is also difficult as the multiple power systems must be controlled independently. Another example of the prior art provides a large balloon with vectoring engines on the side of the balloon and lift rotors on a truss structure underneath the balloon.

Since these and other similar prior art designs require multiple power systems for vertical lift and vectoring thrust, operational controls are complex. Moreover, the support systems and structure are large and difficult to assemble. The overall weight of the structure is large and necessitates an increase in the size of the lighter-than-air element. This overall size increase and complexity of design also results in a housing problem as special hangars or support buildings are required. Maintenance is also an issue with these designs as many of the systems are difficult to access.

SUMMARY

The present disclosure provides an aerial load lifting system that overcomes the aforesaid and other disadvantages of the prior art by providing a neutral buoyancy or lighter-than-air aircraft comprising non-rigid or blimp-type lighter-than-air envelope surrounded at least in part by a structural shell. The structural shell contains the lighter-than-air envelope, and supports the cargo load, the engine(s), fuel tank(s), rotors, and transmission system(s) that power the lift and vectoring of the aircraft. The structural shell is designed to transfer the weight of the load essentially directly to the location of the rotors, thus avoiding unnecessary stress on the envelope. Utilizing a structural shell instead of utilizing a conventional frame or truss structure, large booms or hanging the apparatus from either a cable or from multiple cables from the balloon as in the prior art provides significant advantages, since we make a shell lighter than a "frame". The system is designed so that the envelope provides essentially neutral buoyancy for the structure including the structural shell, engines, fuel tanks, rotors and transmissions, leaving essentially only the cargo weight to be lifted by the rotors. Preferably, but not necessarily the rotor controls are similar to standard helicopter rotor controls. Thus, the present disclosure provides a relatively compact and simple design for an aerial lifting system that is capable of transporting very heavy loads to remote locations.

In another aspect of the present disclosure provides an aerial transportation system comprising: an envelope filled with a lighter-than-air gaseous substance. A structural shell surrounds the envelope at least in part. A power train system including at least one engine and at least one rotor is supported by the structural shell, wherein the envelope provides a buoyant force essentially to offset the weight of the structural shell and the power train system.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings wherein like numerals depict like parts, and wherein:

FIG. 1A is a side view of the a lighter-than-air vertical lifting system in accordance with one embodiment of the present disclosure;

FIG. 1B is a rear view of the lighter-than-air vertical lifting system depicted in FIG. 1A;

FIGS. 2A and 2B are side and rear views, respectively, of the structural shell shown in FIGS. 1A and 1B;

FIG. 2C is a side elevational view, illustrating the envelope without the structural shell.

DESCRIPTION

Figure 3:
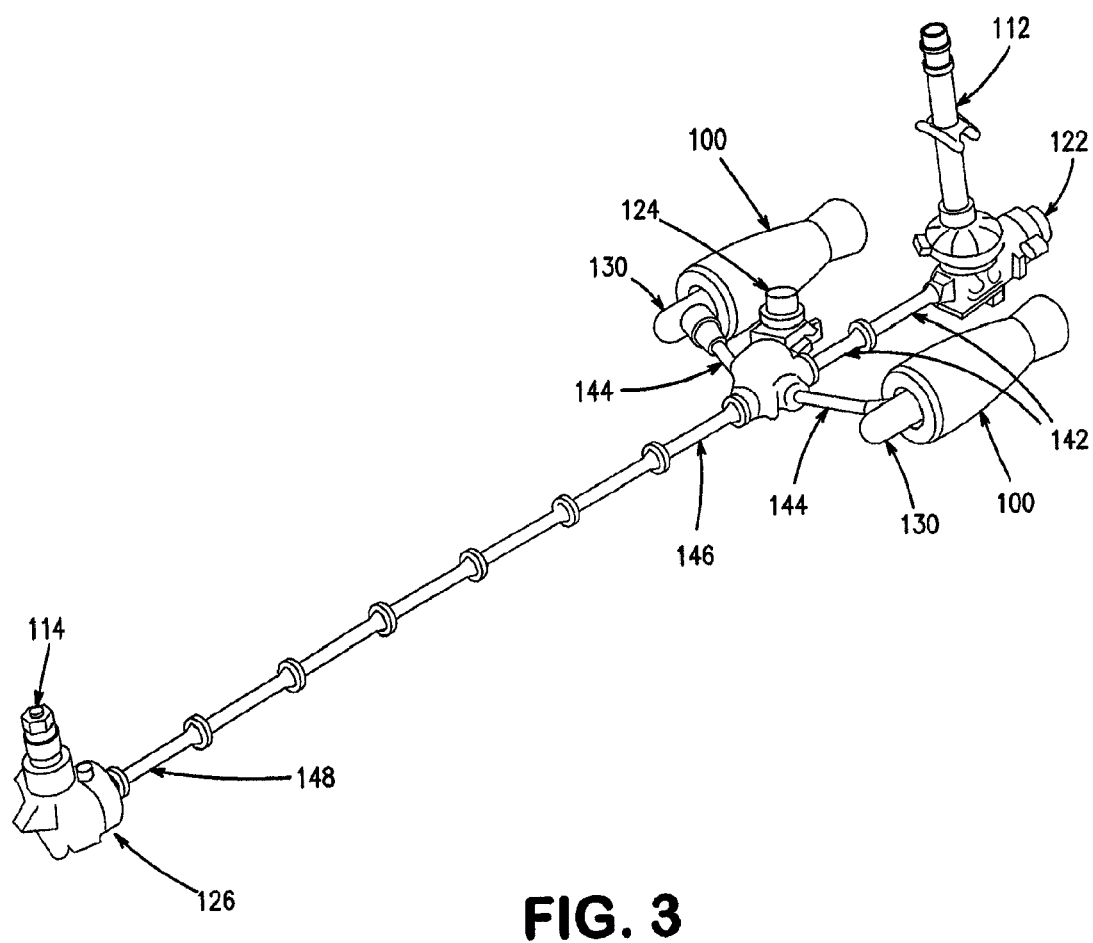
FIG. 3 is an illustration of the power train and engine systems of the system depicted in FIG. 1A.

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

One embodiment provides a lighter-than-air aerial load lifting system comprising a dirigible-type vehicle having a lighter-than-air envelope and a structural shell that surrounds the envelope at least in part and supports the combined lift and vectoring systems as well as a load of cargo. The structural shell, which preferably is formed of a light weight metal such as aluminum or titanium, or a composite material contains the lighter-than-air envelope, and transfers the weight of the cargo to the location of the lift and vectoring systems, minimizing stress on the envelope. The size of the apparatus is compact as the envelope and structural shell fit together allowing the envelope to provide essentially neutral buoyancy to the support structure and allow for the rotors to provide the power for lift and directional control.

Referring to FIGS. 1A and 1B, an exemplary embodiment provides an airship that generally comprises a lighter-than-air blimp-like envelope 10 that provides essentially neutral buoyancy for the apparatus. The envelope 10 is placed within a structural shell 50 that in turn supports the load of cargo 20 via using four cargo hooks 30 and corresponding cables 32.

The structural shell 50 further supports a cockpit 52 for housing a pilot, retractable landing gear 54, cross-members 58, and engine systems that provide the lifting and vectoring capabilities of the aircraft. The engine systems include one or more fuel tanks 42, engines 100, rotors 200, transmissions 120, and a drive shaft 140. The flight controls of the aircraft are similar to those of a helicopter.

FIGS. 2A and 2B show the structural shell without the load of cargo 20 or the envelope 10. In this view, it is easily seen that this embodiment provides a relatively compact profile for storage purposes.

FIG. 2C shows the envelope 10 without the structural shell. In one preferred embodiment, the structural shell is shaped to allow the dirigible envelope 10 to be slid horizontally into place, as can be seen in FIGS. 2A and 2C. The envelope 10 preferably includes internal vertical supports 16 that are located beneath where the rotors are to allow the weight of the cargo to be transferred directly to the rotors without placing stress on the envelope. Also, if desired, the envelope 10 may include a plurality of internal valved bladders 18 which maintain the lighter-than-air gaseous substance at constant pressure.

The envelope is filled with an inert gas having a lower molecular weight than that of air, e.g. helium. The envelope has an outer skin that should be made of a durable and light material that will seal the inert gas within. This material may be a nylon or polyurethane material or a composite material that is commercially available. Using such materials, modern blimp envelopes last up to ten years with only minor maintenance. Moreover, the envelope may have internal bladders that expand or contract, maintaining the internal pressure of the envelope in changing altitudes and isolating potentially dangerous punctures in the outer skin.

The illustrated embodiment provides many advantages over the prior art in terms of operational requirements, including smaller storage space and simpler controls. In addition, the illustrated embodiment has fewer drive train components and fewer rotors. Because the drive train components and controls are similar to those currently in existence, fewer developmental costs will be incurred.

Another embodiment utilizes dual engines and rotors, wherein the power from the engines is combined by a combining transmission and delivered to each rotor by various drive shafts. Referring to FIG. 3, input combining drive shafts 144 connect the nose gears 130 of the dual engines 100 to the combining transmission 124. Forward drive shafts 146, 148 and aft drive shafts 142 deliver the power from the combining transmission 124 to the forward transmission 126 and the aft transmission 122, respectively. Forward and aft vertical drive shafts 114, 112 deliver the power from the forward and aft transmissions 126, 122 to the rotors. This powerful and efficient design will allow the dirigible-type aerial lifting system to operate similar to a conventional helicopter with two overhead rotors.

Figure 4:
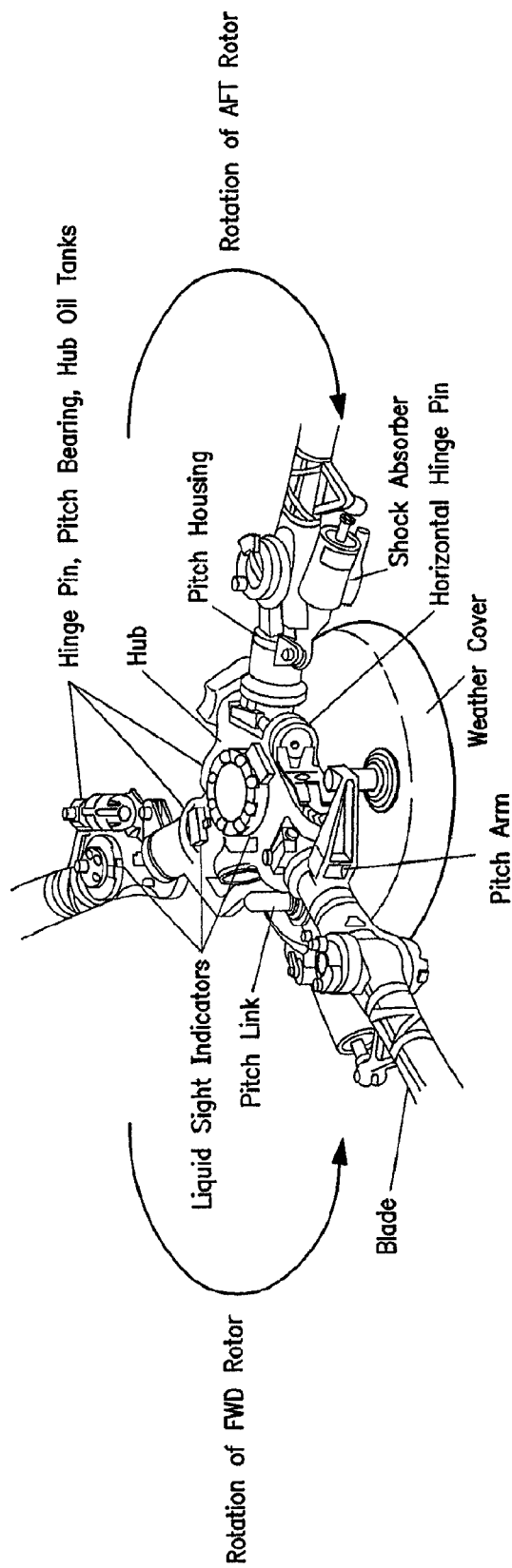
FIG. 4 is an illustration of a rotor hub of the system depicted in FIG. 1A.

In another embodiment, the rotors are designed similar to high-performance helicopters for optimal lift and durability. Referring to FIG. 4, the rotors of this embodiment rotate in opposite directions. Other features of the rotor system are in accordance with prior art rotor designs.

It should be emphasized that the above-described embodiments are merely possible examples of implementations and merely set forth for a clear understanding of the principles of the disclosure. Many different embodiments of the lighter-than-air vertical load lifting system described herein may be designed and/or fabricated without departing from the spirit and scope of the disclosure. For instance, the system may be operated remotely by a radio controlled device 300 using onboard cameras instead of having a pilot in a cockpit. Further changes to the structural shell and drive train may be made to maximize the lifting capability of the apparatus. All these and other such modifications and variations are intended to be included herein within the scope of this disclosure and protected by the following claims. Therefore the scope of the disclosure is not intended to be limited except as indicated in the appended claims.

The invention claimed is:

1. An aerial load lifting system for transporting a load, comprising:
    an envelope filled with a lighter-than-air gaseous substance;
    a structural shell for supporting the load, wherein the structural shell is shaped to allow the envelope to be slid horizontally into the structural shell such that the structural shell is surrounded at least in part by the structural shell; and
    a power train system including at least one engine supported by the structural shell and located above the envelope, and at least one rotor oriented in a substantially horizontal plane supported by the structural shell and located above the envelope, wherein the envelope provides a buoyant force essentially to offset the weight of the structural shell and the power train system, wherein the power train system provides a lifting force capable of lifting the load.

2. The system of claim 1, wherein the structural shell has an opening through which the envelope may be inserted.

3. The system of claim 1, wherein the envelope has a plurality of internal bladders which maintain the lighter-than-air gaseous substance at a constant pressure and at least one internal support positioned underneath the at least one rotor to allow the weight of a cargo to be transferred directly to the at least one rotor.

4. The system of claim 1, wherein the gaseous substance is helium.

5. The system of claim 1, wherein the structural shell is primarily formed of aluminum, titanium, or a composite material.

6. The system of claim 1, wherein the structural shell supports a cockpit for housing a pilot.

7. The system of claim 6, wherein the cockpit is located to provide a pilot with an unobstructed view of the load during a loading or unloading process.

8. The system of claim 1, wherein the system is operated using a radio control system.

9. The system of claim 1, wherein the structural shell includes plurality of fixtures located on a bottom side of the structural shell to which cargo cables may be attached.

10. The system of claim 1, wherein the power train system includes a combining transmission to combine power from multiple engines to one or more drive shafts coupled to the at least one rotor.

11. The system of claim 1, wherein the power train includes two motors coupled to the at least one rotor.

12. The system of claim 1, wherein the structure shell further supports retractable landing gear.

13. An aerial transportation system, comprising:
an envelope filled with a lighter-than-air gaseous substance;
a structural shell surrounding the envelope at least in part wherein the structural shell is shaped to allow the envelope to be slid horizontally into the structural shell such that the structural shell is surrounded at least in part by the structural shell; and
a power train system including at least one engine and at least one rotor, the power train system located above the envelope;
wherein the envelope provides a buoyant force essentially to offset the weight of the structural shell and the power train system and wherein the power train system provides a lifting force, and wherein the at least one rotor is located above the envelope and the at least one engine is located above the envelope.

14. The system of claim 13, wherein the envelope has a plurality of internal bladders which maintain the lighter-than-air gaseous substance at a constant pressure.

15. The system of claim 13, wherein the structural shell is primarily formed of aluminum, titanium, or a composite material.

16. The system of claim 13, wherein the structural shell supports a cockpit for housing a pilot.

17. The system of claim 16, wherein the cockpit is located to provide a pilot with an unobstructed view of the load during a loading or unloading process.

18. The system of claim 13, wherein the structure shell further supports retractable landing gear.

19. The system of claim 1, wherein structural shell includes an non-linear structural shell element positioned along approximately ¾ of the envelope, the non-linear structural shell element having at least two ending portions, each having at least one fixture to which cargo cables may be attached, and a linear structural shell element positioned between the at least two ending portions of the non-linear structural shell element, the linear structural shell element positioned to receive a resultant compressive force from the load.

20. The system of claim 1, wherein the envelope is positioned between the at least one rotor and the load.

21. The aerial load lifting system for transporting a load of claim 1, wherein the envelope includes at least one internal support located substantially directly below the at least one rotor and connected between the at least one rotor, wherein the at least one internal support transfers weight force from the load directly to the at least one rotor.

22. The aerial load lifting system for transporting a load of claim 1, wherein the structural shell has a substantially cylindrical shape and further comprises a plurality of cables supporting a removable quantity of cargo, wherein a first portion of the plurality of cables are affixed to a left side of the structural shell in a position underneath the rotor and a second portion of the plurality of cables are affixed to a right side of the structural shell in a position underneath the rotor, opposite the left side of the structural shell.

\* \* \* \* \*